(12) United States Patent
Shearer et al.

(10) Patent No.: US 9,285,964 B2
(45) Date of Patent: Mar. 15, 2016

(54) AUTOMATICALLY RECOVERING AND MAINTAINING FOCUS

(71) Applicant: Google Inc., Mountain View, CA (US)

(72) Inventors: Rachel Welles Shearer, San Francisco, CA (US); Tiruvilwamalai Venkatraman Raman, San Jose, CA (US); Aditya Krishna Bhandaru, San Jose, CA (US); James Benjamin deBoer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/920,176

(22) Filed: Jun. 18, 2013

(65) Prior Publication Data

US 2015/0169152 A1    Jun. 18, 2015

(51) Int. Cl.
*G06F 3/0484* (2013.01)

(52) U.S. Cl.
CPC .......... *G06F 3/0484* (2013.01); *G06F 3/04842* (2013.01)

(58) Field of Classification Search
CPC ..................................................... G06F 3/0484
USPC ........................................................ 715/760
See application file for complete search history.

(56) References Cited

U.S. PATENT DOCUMENTS

| | | | |
|---|---|---|---|
| 5,736,974 A * | 4/1998 | Selker | G06F 3/04895 345/157 |
| 7,440,997 B2 | 10/2008 | Colling et al. | |
| 7,574,669 B1 * | 8/2009 | Braun | G06F 3/0483 715/776 |
| 7,636,897 B2 * | 12/2009 | Koralski et al. | 715/767 |
| 7,890,885 B2 * | 2/2011 | Muller et al. | 715/808 |
| 8,166,054 B2 | 4/2012 | Fu et al. | |
| 8,250,478 B2 * | 8/2012 | Dharmarajan et al. | 715/760 |
| 8,732,613 B2 * | 5/2014 | Li et al. | 715/833 |
| 9,009,612 B2 * | 4/2015 | Fleizach et al. | 715/763 |
| 2006/0090138 A1 * | 4/2006 | Wang et al. | 715/760 |
| 2006/0248463 A1 | 11/2006 | Forkner et al. | |
| 2010/0005053 A1 | 1/2010 | Estes | |
| 2013/0212499 A1 * | 8/2013 | Mentchoukov et al. | 715/760 |

* cited by examiner

*Primary Examiner* — David Phantana Angkool
(74) *Attorney, Agent, or Firm* — Fish & Richardson P.C.

(57) ABSTRACT

Disclosed are methods that may include determining that a focus setting of a first web page interaction state is an invalid focus setting. A navigation history log may be accessed that includes an indication of a second web page interaction state accessed by a user prior to the user accessing the first web page interaction state. Based upon the navigation history log, a third web page interaction state that includes an interactive element with a valid focus setting may be identified. The third web page interaction state may be presented to the user in which the interactive element with the valid focus setting having focus in the presented third web page interaction state.

20 Claims, 3 Drawing Sheets

210 — detect a requested transition from a previous interaction state to a present interaction state in a web page application 220 — Identifying a focused element in the present interaction state of the web page application.

230 — Determining that the present interaction state may not be included in a logical document structure related to the web page.

240 — Analyzing a navigation history to identify a focus-valid interaction state prior to the previous interaction state.

250 — Verifying that the identified focus-valid interaction state is included in the logical document structure for the web page application.

260 — Generating a command for a web browser to set focus to the focus-valid interaction state

AUTOMATICALLY RECOVERING AND MAINTAINING FOCUS

BACKGROUND

Web browsers may execute interactive web pages that indicate the active input regions for the user to interact with the web page. The term "focus" may refer to a property of an item (e.g., the active input region or web page element) in a web page, which defines whether or not the item is the item with which the user is currently interacting as commonly used in the art. For example, a web page element that "has focus" can accept keyboard or mouse events, or other forms of input. An item that does not have focus typically will not receive input from an interface device until it receives focus, such as by way of an initial selection by a user. In typical interactive systems, user events such as key presses and mouse clicks are received by the item with focus. A common problem when interacting with web applications having web pages with multiple dialog boxes is that focus often gets dropped, or is set to a location unexpected by the user. For example, when a user navigates from a dialog box using a keystroke, the user expects their focus, or prompt, to return to a logical place in the web page, such as a location in a previous dialog box or a location that spawned the dialog box. However, often times, the focus returns to a default region of the spawning web page. The default region may be based on default settings of a web browser in which the web page is executed.

BRIEF SUMMARY

According to an implementation of the disclosed subject matter, a method may include determining that a focus setting of a first web page interaction state is an invalid focus setting. A navigation history log may be accessed that includes an indication of a second web page interaction state accessed by a user prior to the user accessing the first web page interaction state. Based upon the navigation history log, a third web page interaction state that includes an interactive element with a valid focus setting may be identified. The third web page interaction state may be presented to the user in which the interactive element with the valid focus setting has focus in the presented third web page interaction state.

According to an implementation of the disclosed subject matter, a method may include a processor that may detect a requested transition from a previous interaction state to a present interaction state in a web page application. A focused element may be an active interactive element for accepting input. The focused element in the present interaction state of the web page application may be identified. It may be determined that the present interaction state may not be included in a logical document structure related to the web page. A navigation history may be analyzed to identify a focus-valid interaction state prior to the present interaction state. The identified focus-valid interaction state may be verified based on a logical document structure for the web page application. Based on the verification, a command may be generated for a web browser to set focus to an interactive element in the focus-valid interaction state.

According to an implementation of the disclosed subject matter, a method may include a processor that may receive a web browser navigation input prior to the input being delivered to a web browser. The web browser navigation input may request a transition from a second web page element to a first web page element of a web page. The second web page element may be determined to be an invalid location for focus in the web page. A prior valid location may be located based upon a navigation history and a document logical structure. A prior valid location may be set as the focused element of the web page.

According to an implementation of the disclosed subject matter, a method may include a processor that may receive an input to navigate from a current web page element in a web page. An analysis of a logical document structure may determine that the current web page element related to the current location is invalid as a focused web page element. The focused web page element may be an active interactive web page element. In response to the logical document structure analysis that the current location may be invalid, a navigation history log may be reviewed to determine if a prior location is a valid location for a focused web page element.

According to an implementation of the disclosed subject matter, a method may include detecting, by a processor, a requested transition from a previous interaction state to a present interaction state in a web page application. A navigation history having an indication of the previous interaction state and the present interaction state may be accessed. Based upon the navigation history, a focusable element may be selected in the present interaction state. The selected focusable element may be verified to be included in a logical document structure for the web page application. Based on the verification, a command for a web browser may be generated to set focus to the selected focusable element.

Additional features, advantages, and implementations of the disclosed subject matter may be set forth or apparent from consideration of the following detailed description, drawings, and claims. Moreover, it is to be understood that both the foregoing summary and the following detailed description includes examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 2 shows a flow chart according to an implementation of the disclosed subject matter.

DETAILED DESCRIPTION

The disclosed subject matter relates to maintaining the focus of an element in a web page as a web browser transitions from a web page interaction screen to a prior web page interaction screen. As discussed herein and as commonly used in the art, the term "focus" may refer to a property of an item (e.g., the active input region or web page element) in a web page, which defines whether or not the item is the item with which the user is currently able to interact or interacting. An indication may include a position location of a cursor, a flag or some other indicator indicating whether the last focus setting was within a viewable area of a website, whether the last focus setting is still attached to the web page document, or whether the last focus setting is able to receive focus again. An interaction state may be a web page state that presents an indication that interaction with a web browser is possible through an active control that may be set to active by the focus setting. The interaction state with focus may be ready for user selection. For example, the web browser may highlight an input button in a different color or surround the button with colored surround.

The default region of focus may be set by the web browser. For example, the default region of focus may be an item, such as a "Home" button, in the top left hand corner of the web page. As a result, if a developer inadvertently does not set a web page item as the item that is to receive focus when a user navigates away from an interaction screen, the default focus region for the web browser may not be the place in the web page that a user expected. For example, the default region "home" button may be a number of keystrokes away from the point in the web page that the user entered an initial interaction screen (e.g., a dialog box). Not only may the user be confused, but the user may also become frustrated because returning to the expected location of focus may require a number of inputs, such as numerous keystrokes or number of mouse clicks.

Additionally, this problem may be exacerbated when a screen reader is being used by a sight-impaired person and the screen reader announces that the focused element is, for example, the "Home" button in a menu bar that was completely unrelated to the earlier interaction screen with which the user was previously interacting. An advantage of the disclosed subject matter is that it alleviates the need for the user having to reset focus to the desired location by hand—either via the mouse, or by repeated uses of the keyboard. Others that may benefit may be sighted motor-impaired users who cannot use a mouse but uses a keyboard to move focus through a web page.

Figure 1:
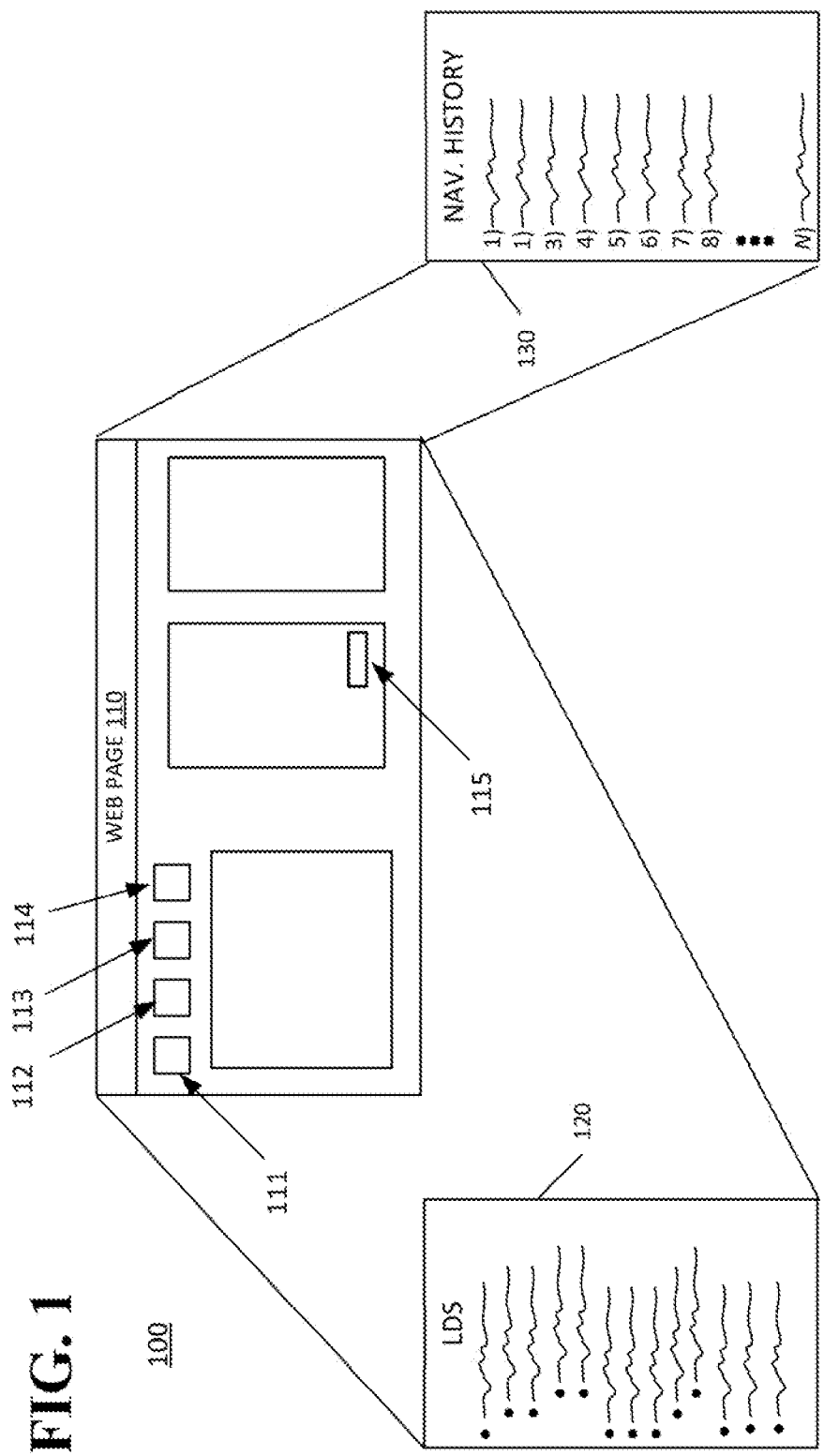
FIG. 1 shows a graphical representation according to an implementation of the disclosed subject matter.

FIG. 1 illustrates a graphical representation of an implementation of the disclosed subject matter. In the illustrated implementation 100, a web application may be executed by a web browser. A graphical user interface may be presented as a web page 110 on a display device. The web page 110 may have web page elements 111-115 that may be controls such as buttons, presented in the web page 110. The web page elements 111-115 when selected may cause the generation of a different input or dialog screens, such as on-line purchase windows, "share content" windows, print/save windows, data entry windows and the like. The organization of the web page 110 may be determined by a logical document structure (LDS) 120. The LDS 120 may be, for example, a document object model (DOM), that may be used to identify elements in the web page that may be set as active interface elements. For example, the elements 111-115 in the web page 110 may be listed as in the LDS 120 and may be considered elements that may be determined to be focus-valid elements. Conversely, the generated dialog boxes described above may not be shown in the LDS 120 because the respective screens forming the dialog boxes may be considered transient and are functional windows for accepting inputs used for performing a specific function. For example, when the function has been completed, the dialog boxes may be removed from the LDS 120. As a result, user selectable elements in the respective screens of the generated dialog boxes may be invalid for focus. It may also possible that the dialog boxes continue to be listed in the LDS 120 but cannot be considered valid locations for focus for other reasons. For example, if they are styled by a developer to look invisible to the user, then the user selectable elements in the respective screens of the generated dialog boxes may be invalid for focus. As a result, user selectable elements in the respective screens of the generated dialog boxes may be invalid for focus.

At the initial presentation of the web page 110 to the on a display device, the web browser in which the web page 110 is presented may set an interactive element as the active element, such as, for example, element 111. In this case, the active element 111 may be said to have "focus" as described above. The element that has focus may be based on developer or default web browser settings. In the absence of specific settings by a developer, the focus setting may be the web browser default setting, such as a home button in the top left hand corner of the respective web page. For example, one of the web page elements 111-115, when selected, may be a control box or button that may cause the generation of a dialog box, and the first interaction state may be within the dialog box, which may have multiple buttons. The user scrolls through the multiple controls using the "TAB" keyboard button until the user arrives at the "Cancel" control in a screen originating from the dialog box, where the user presses the "ENTER" keyboard button. In response to the "ENTER" input, the dialog box is no longer presented on the display device. In which case, without developer settings, the browser default may place the focus on an interactive element at the top of the web page 110, such as web page element 111.

Figure 3:
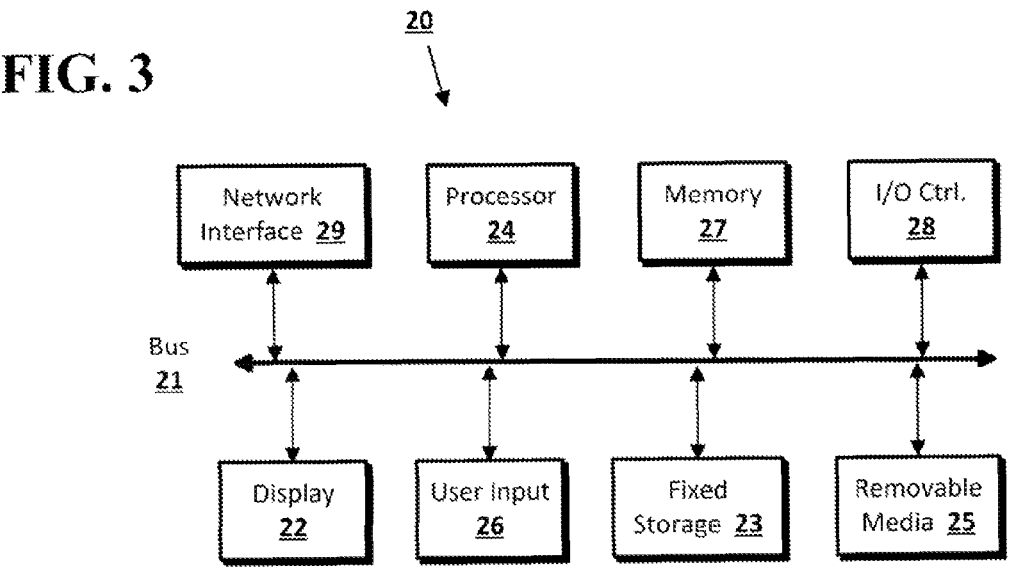
FIG. 3 shows a computer according to an implementation of the disclosed subject matter.

A processor, as described below with respect to FIG. 3, may be configured to track a user's navigation inputs and progression through the web page and related screens that may originate from the user's interaction with the web page. The user's progression through the web page may be stored in a navigation history 130 data structure, or log. For example, web page element 111 may be selected by a user and an indication of the selection may be stored in a data structure, such as a navigation history 130. The navigation history 130 may be acquired, for example, by tracking web page locations in the web page 110 as the user selects or uses keystrokes to move to a certain location, such as web page elements, in the web page and in dialog boxes. The navigation history 130 may include a sequence of locations within the web page at which the user interacted or viewed content in the web page 110. The user's progression through and interaction with the web page 110 elements, such as elements 111-115 and those in screens generated from dialog boxes, may be stored in the navigation history 130 data structure. For example, a user may begin interacting with a web page at web page element 111 and may interact with any of web page elements 112-115.

One of the elements 111-115 may be currently selected and may be highlighted to indicate that it is the currently active element. The currently active element may be an element that is able to accept inputs from a user or may spawn additional input screens, such as a dialog box. In an implementation, a web page element, such as one of elements 111-115, may also be a dialog box or an element within the dialog box. For example, an element may be a child of another element.

FIG. 2 shows a flow chart according to an implementation of the disclosed subject matter. In some implementations, the disclosed subject matter may be a process 200 that includes tracking user interaction states within a web page, and preserving valid interaction states. As mentioned above, the interaction state may be when a web page control is active and may be ready for a user selection of the active control. The validity of an interaction state may be determined based on a number of heuristics, such as, for example, whether the location of the web page control is an expected location, in addition to whether a web page control is associated with a logical document structure. The active control may be a graphical user input that may be set to active by the focus setting of the web browser. The focus setting may set an interactive web page element to have an active setting for accepting inputs from a user. Upon an indication of selection of the control, a dialog box or other screen associated with a function of the control may be presented on a display device. At step 210, the process 200 may detect a requested transition from a previous interaction state to a present interaction state in a web page application. The transition request may be considered a web browser navigation input that is received by a processor prior to being provided to the web browser. The transition request may be, for example, an input received from a "TAB" keyboard button, an "ENTER" keyboard button or similar button. A focused element, which may be an active interactive element that is waiting for user interaction in the web page application, may be identified (220). Alternatively, a transition may be logged from a first interaction state that may include the identified focus element to a second interaction state may be noted. For example, a history of user interaction within a web page, such as web page 110 of FIG. 1, may be stored in a data structure. The user interaction history may include different interaction states that a user attains within a web page as the user navigates through the web page. The process 200 executing on a processor may also determine either that the focus of the active interactive element in the second interaction state is a valid focus setting or that a focus setting of a first web page interaction state is an invalid focus setting. The invalid focus setting may be determined to be a focused element in the new interaction state of the web page application that is not presented on a display device. Conversely, a valid focus setting may be determined to be a focused element in the new interaction state of the web page application that is not presented on a display device. For example, a developer may set focus to be at a location that is not a displayable portion, such as position −1000, of a web page. The present interaction state may be determined not to be included in a logical document structure related to the web page (230). This may be done, for example, by analyzing a logical document structure, such as a document object model (DOM) of the web page, for valid locations or interaction states that are suitable for a valid focus setting. In some implementations, the logical document structure is a document object model of the second web page. A navigation history may be accessed and analyzed to identify a focus-valid interaction state prior to or including the first or previous, interaction state (240). The navigation history may include, for example, an indication of an interaction state of a second web page accessed by a user prior to the user accessing the first web page interaction state. In response to the identification of a focus-valid interaction state, the process 200 may verify that the identified focus-valid interaction state is included in the logical document structure for the web page application (250). In some implementations, a third web page interaction state, or web page element, may be identified that may include an interactive element with a valid focus setting. In which case, the identified web page element may be selectable as a focused element in the interaction state and be set as the focused element. This may be performed by checking for a valid focus setting when the user reaches a new interaction state by examining the recorded interaction history to find a valid interaction state if the application fails to set focus on the current interaction screen. In response to verification that the identified focus-valid interaction state is included in the logical document structure, a command may be generated by the processor for the web browser to set focus to the focus-valid interaction state (260). The processor may send the command instructing the web browser to set the focus. When a third web page interaction state is identified, the third web page interaction state with an interactive element with a valid focus setting may be presented. In some cases, the third web page interaction state may be the second web page interaction state. Similarly, the second web page may be the first web page. For example, a first interaction state and a second interaction state may be states of a single web page, such as a popup "window" or the like.

In a specific example, a user may be navigating through a dialog box to a "Cancel" button; the user may press the "Enter" button. In response, the dialog box may no longer be presented on the display device, but the focused element is still the "Cancel" button. The focused "Cancel" button is now an invalid focus element because the dialog box and the "Cancel" button are no longer associated with the logical document structure. In the presented web page, no web page element is set to have focus until a user initiates, for example, by pressing a "TAB" button, a transition request to navigate to another part of the web page. In which case, an implementation of the disclosed process detects the transition request and intercepts it prior to the transition request being delivered to the web browser. By reviewing the navigation history, a page element that previously had focus may be identified by determining whether the page element is attached to the logical document structure. Other indicators may be that the element is not in the viewable or displayable area of the web page.

In an implementation, the processor may periodically clean up the navigation history of interaction states by eliminating states that are no longer focus-valid, e.g., states that cannot be returned to because they no longer exist. For example, an interaction state that may include a dialog box is no longer presented in the web page or an on-line transaction window has been closed, may be removed from the navigation history. This may improve the efficiency and speed of the processing to determine a valid focus setting from and invalid focus setting. In other implementations, the described processes may be used to test applications by analyzing application code to confirm that focus is meaningfully set when transitioning through interaction states can be used within developer tools that aid in helping developers identify and fix errors in their application at development time.

Implementations of the presently disclosed subject matter may be implemented in and used with a variety of component and network architectures. FIG. 3 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The fixed storage 23 may also maintain a software module that when executed by the central processor 24 may cause user interactions to be recorded and may cause various interaction states of the web page application to be sent to a navigation history stack for data storage. For example, a web application stored in fixed storage 23 may be executed by the central processor 24 using a web browser. The stored navigation history may be accessed by the central processor 24 or other processors connected to the computer 20.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. The fixed storage 23 may store program instructions that when executed by the processor 24 perform the functions described herein. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
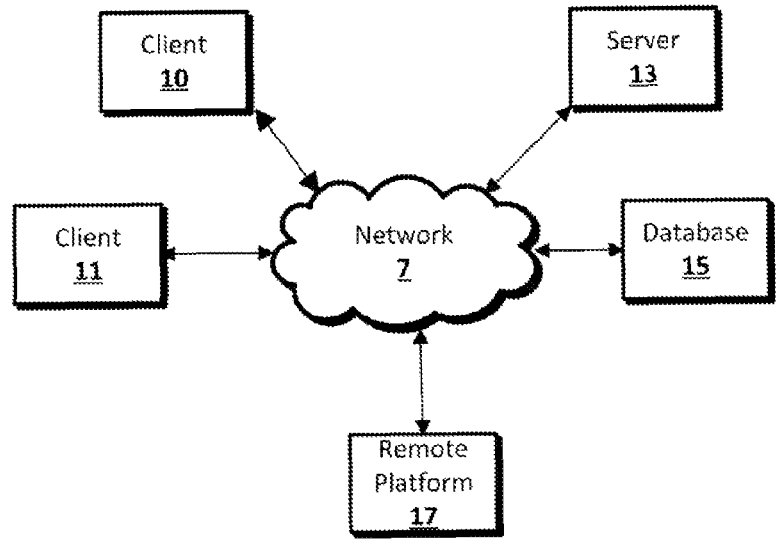
FIG. 4 shows a network configuration according to an implementation of the disclosed subject matter.

FIG. 4 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
setting focus on, and receiving a selection of, a particular interactive element on a web page;
storing data indicating that focus was set on the particular element on the web page, in a navigation history;
in response to receiving the selection of the particular interactive element on the web page, providing, for display, a dialog box;
setting focus on, and receiving a selection of, a particular interactive element of the dialog box that causes the dialog box to be removed from display;
receiving a request to change focus from one element to another
identifying one or more interactive elements of the web page on which focus be set;
determining that, when the request to change focus from one element to another was received, focus was set on the particular interactive element of a dialog box that was provided for display in response to receiving the selection of a particular interactive element on the web page, that the particular interactive element of the dialog box is not identified among the one or more active interface elements of the web page; and in response to determining that focus was set on the element of the dialog box, identifying, in the navigation history, the particular interactive element on the web page as a latest interactive element to have focus before the dialog box was provided for display, and, in response, setting focus on the particular interactive element of the web page.

2. The method of claim 1, wherein the dialog box comprises an on-line purchase window, a share-content windows, a print window, a save window, or a data entry window.

3. The method of claim 1, wherein setting focus on, and receiving a selection of, a particular interactive element of the dialog box that causes the dialog box to be removed from display comprises receiving data indicating a press of a tab keyboard button, an enter keyboard button, or an arrow keyboard button.

4. The method of claim 1, comprising:
determining a logical document structure of the web page,
wherein identifying one or more interactive elements of the web page on which focus be set is based on the logical document structure.

5. The method of claim 1, wherein receiving the request to change focus from the one element to the other occurs before a web browser that displays the web page receives the request.

6. The method of claim 1, wherein storing data indicating that focus was set on the particular element on the web page, in a navigation history comprises:
determining that an element in the navigation history is not focus-valid; and
removing the element from the navigation history.

7. The method of claim 4, wherein the logical document structure is a document object model.

8. The method of claim 4, wherein the logical document structure includes data indicating whether each interactive element of the web page is focus-valid.

9. A system comprising:
one or more computers and one or more storage devices storing instructions that are operable, when executed by the one or more computers, to cause the one or more computers to perform operations comprising:
setting focus on, and receiving a selection of, a particular interactive element on a web page;
storing data indicating that focus was set on the particular element on the web page, in a navigation history;
in response to receiving the selection of the particular interactive element on the web page, providing, for display, a dialog box;
setting focus on, and receiving a selection of, a particular interactive element of the dialog box that causes the dialog box to be removed from display;
receiving a request to change focus from one element to another
identifying one or more interactive elements of the web page on which focus be set;
determining that, when the request to change focus from one element to another was received, focus was set on the particular interactive element of a dialog box that was provided for display in response to receiving the selection of a particular interactive element on the web page, that the particular interactive element of the dialog box is not identified among the one or more active interface elements of the web page; and
in response to determining that focus was set on the element of the dialog box, identifying, in the navigation history, the particular interactive element on the web page as a latest interactive element to have focus before the dialog box was provided for display, and, in response, setting focus on the particular interactive element of the web page.

10. The system of claim 9, wherein the dialog box comprises an on-line purchase window, a share-content windows, a print window, a save window, or a data entry window.

11. The system of claim 9, wherein setting focus on, and receiving a selection of, a particular interactive element of the dialog box that causes the dialog box to be removed from display comprises receiving data indicating a press of a tab keyboard button, an enter keyboard button, or an arrow keyboard button.

12. The system of claim 9, wherein the operations further comprise:
determining a logical document structure of the web page,
wherein identifying one or more interactive elements of the web page on which focus be set is based on the logical document structure.

13. The system of claim 9, wherein receiving the request to change focus from the one element to the other occurs before a web browser that displays the web page receives the request.

14. The system of claim 9, wherein storing data indicating that focus was set on the particular element on the web page, in a navigation history comprises:
determining that an element in the navigation history is not focus-valid; and
removing the element from the navigation history.

15. A non-transitory computer-readable medium storing software comprising instructions executable by one or more computers which, upon such execution, cause the one or more computers to perform operations comprising:
setting focus on, and receiving a selection of, a particular interactive element on a web page;
storing data indicating that focus was set on the particular element on the web page, in a navigation history;
in response to receiving the selection of the particular interactive element on the web page, providing, for display, a dialog box;
setting focus on, and receiving a selection of, a particular interactive element of the dialog box that causes the dialog box to be removed from display;
receiving a request to change focus from one element to another
identifying one or more interactive elements of the web page on which focus be set;
determining that, when the request to change focus from one element to another was received, focus was set on the particular interactive element of a dialog box that was provided for display in response to receiving the selection of a particular interactive element on the web page, that the particular interactive element of the dialog box is not identified among the one or more active interface elements of the web page; and
in response to determining that focus was set on the element of the dialog box, identifying, in the navigation history, the particular interactive element on the web page as a latest interactive element to have focus before the dialog box was provided for display, and, in response, setting focus on the particular interactive element of the web page.

16. The medium of claim 15, wherein receiving the request to change focus from the one element to the other occurs before a web browser that displays the web page receives the request.

17. The medium of claim 15, wherein storing data indicating that focus was set on the particular element on the web page, in a navigation history comprises:

determining that an element in the navigation history is not focus-valid; and removing the element from the navigation history.

18. The medium of claim 15, wherein the operations further comprise:

determining a logical document structure of the web page, wherein identifying one or more interactive elements of the web page on which focus be set is based on the logical document structure.

19. The medium of claim 15, wherein setting focus on, and receiving a selection of, a particular interactive element of the dialog box that causes the dialog box to be removed from display comprises receiving data indicating a press of a tab keyboard button, an enter keyboard button, or an arrow keyboard button.

20. The medium of claim 15, wherein the dialog box comprises an on-line purchase window, a share-content windows, a print window, a save window, or a data entry window.

\* \* \* \* \*